United States Patent
Kohno et al.

(10) Patent No.: US 7,504,181 B2
(45) Date of Patent: Mar. 17, 2009

(54) NONAQUEOUS LIQUID ELECTROLYTE AND NONAQUEOUS LIQUID ELECTROLYTE SECONDARY BATTERY

(75) Inventors: Tatsuoki Kohno, Tokyo (JP); Norio Takami, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/748,873

(22) Filed: May 15, 2007

(65) Prior Publication Data

US 2007/0218352 A1 Sep. 20, 2007

Related U.S. Application Data

(62) Division of application No. 10/083,372, filed on Feb. 27, 2002, now Pat. No. 7,235,335.

(30) Foreign Application Priority Data

Mar. 28, 2001 (JP) .............................. 2001-094051
Sep. 27, 2001 (JP) .............................. 2001-297422

(51) Int. Cl.
*H01M 6/16* (2006.01)

(52) U.S. Cl. ........................ 429/329; 429/337; 429/247; 429/303; 429/324; 29/623.1; 252/62.2

(58) Field of Classification Search ................ 429/329, 429/337, 247, 303, 324; 29/623.1; 252/62.2
See application file for complete search history.

(56) References Cited

U.S. PATENT DOCUMENTS

| 4,522,690 | A | 6/1985 | Venkatasetty |
| 5,556,721 | A | 9/1996 | Sasaki et al. |
| 5,846,267 | A | 12/1998 | Fauteux et al. |
| 6,080,282 | A | 6/2000 | Kolb et al. |
| 6,482,545 | B1 | 11/2002 | Skotheim et al. |
| 2002/0160269 | A1 | 10/2002 | Choi et al. |
| 2002/0164531 | A1 | 11/2002 | Sekino et al. |
| 2004/0202939 | A1 | 10/2004 | Clarke et al. |

FOREIGN PATENT DOCUMENTS

| GB | 2 328 786 A | * | 3/1999 |
| JP | 55-12672 | | 1/1980 |
| JP | 61-133582 | | 6/1986 |
| JP | 2000-149992 | | 5/2000 |
| JP | 2000-235868 | | 8/2000 |
| JP | 2000-331715 | | 11/2000 |
| JP | 2001-23684 | | 1/2001 |

* cited by examiner

*Primary Examiner*—Laura S Weiner
(74) *Attorney, Agent, or Firm*—Oblon, Spivak, McClelland, Maier & Neustadt, P.C.

(57) ABSTRACT

Disclosed is a nonaqueous liquid electrolyte comprising a nonaqueous solvent, an electrolyte dissolved in the nonaqueous solvent and a macromolecular material added to the nonaqueous solvent. The nonaqueous liquid electrolyte is a fluid having a viscosity at 20° C. of 7 cP to 30,000 cP. The nonaqueous liquid electrolyte suppresses leakage, ensures high discharge characteristics, reduces the unevenness of liquid electrolyte, and lessens the change of electrodes and the change in battery resistivity.

5 Claims, 1 Drawing Sheet

NONAQUEOUS LIQUID ELECTROLYTE AND NONAQUEOUS LIQUID ELECTROLYTE SECONDARY BATTERY

BACKGROUND OF THE INVENTION

The present invention relates to a nonaqueous liquid electrolyte and a nonaqueous liquid electrolyte secondary battery Currently, a lithium ion secondary battery has been commercialized as a nonaqueous liquid electrolyte secondary battery intended for a portable device such as a portable cellular phone. This particular battery has a positive electrode, a negative electrode and a separator which contains a liquid electrolyte, wherein utilized are lithium cobalt oxide ($LiCoO_2$) for the positive electrode, a graphitic or carbonaceous material for the negative electrode, an organic solvent in which a lithium salt has been dissolved for the nonaqueous liquid electrolyte and a porous membrane for the separator.

The nonaqueous liquid electrolyte is a nonaqueous solvent in which an electrolyte has been dissolved, for which used usually is a low viscosity and low boiling point material such as a liquid mixture comprising propylene carbonate, ethylene carbonate or γ-butyrolactone, etc.

In the meantime, the nonaqueous liquid electrolyte secondary battery is adapted to be mounted on a portable device as being housed in a hermetically sealed container or the like. In so doing, a problem arises in which the nonaqueous liquid electrolyte may leak out of the hermetically sealed container. The battery also has a disadvantage that its electrodes may deform after charge/discharge cycles to largely swell its outer packaging.

To overcome such problems, a gel-like electrolyte has been proposed to ameliorate such leakage, which contains a solid electrolyte as an ion conducting material instead of using a nonaqueous liquid electrolyte. See, for example, Japanese Patent Unexamined Publication 2000-315523.

Since such a gel-like electrolyte contains a large amount of macromolecular material, however, the resin that is the base therefor will severely prevent the movement of the electrolyte, thereby remarkably reducing the ion conductivity as compared with the case of a nonaqueous liquid electrolyte alone. There has also been a disadvantage that contact with the electrodes will lessen as compared with the case of a liquid, which increases the resistance at the interface of the electrodes, thereby deteriorating the discharge characteristics of the nonaqueous liquid electrolyte secondary battery.

Furthermore, since a gel-like electrolyte is produced by encapsulating an electrolyte and a monomer together with electrodes in an outer packaging for the battery and then filling it with a gelling agent, the electrolyte will become gel-like while the gelling agent infiltrates from around the outer packaging toward the center. As such, there is a disadvantage that a homogeneous gel electrolyte may not easily be obtained between the electrodes and the electrodes per se will considerably deform during the charge/discharge cycles to swell the outer packaging.

As described above, a nonaqueous liquid electrolyte secondary battery utilizing a gel-like electrolyte containing a nonaqueous liquid electrolyte in order to prevent leakage or the like has been unable to provide sufficient discharge characteristics. In addition, a considerable amount of deformation will result in association with the charging and discharging

BRIEF SUMMARY OF THE INVENTION

Accordingly, in the light of the aforementioned disadvantages, an object of the present invention is to provide a nonaqueous liquid electrolyte and a nonaqueous liquid electrolyte secondary battery having high discharge characteristics and suppressed leakage wherein deformation of its electrodes may hardly occur.

Another object of the present invention is to provide a nonaqueous liquid electrolyte secondary battery wherein a liquid electrolyte can be distributed evenly over the surface of its electrodes and ion conductivity will not be reduced.

According to the present invention, there is provided a nonaqueous liquid electrolyte comprising a nonaqueous solvent, an electrolyte dissolved in the nonaqueous solvent and a macromolecular material added to the nonaqueous solvent, wherein the nonaqueous liquid electrolyte is a fluid having a viscosity at 20° C. of 7 cP to 30,000 cP. To allow for deformation of electrodes, it is desirably a fluid having a viscosity of 50 cP or higher.

There is further provided a nonaqueous liquid electrolyte comprising an electrolyte and a macromolecular material both added to a nonaqueous solvent, wherein the nonaqueous liquid electrolyte at 20° C. is a fluid which exhibits non-Newtonian properties.

There is also provided a nonaqueous liquid electrolyte comprising an electrolyte and a macromolecular material both added to a nonaqueous solvent, wherein the ratio of ion conductivity σ ($10^{-3}$ S/cm) to viscosity η (cP), p (σ/η), in the nonaqueous liquid electrolyte at 20° C. is <0.1.

Furthermore, according to the present invention, there is provided a nonaqueous liquid electrolyte secondary battery comprising a positive electrode containing an active material, a negative electrode containing a material which absorbs and desorbs lithium ions and a liquid electrolyte sandwiched between the positive and negative electrodes, wherein the liquid electrolyte comprises a nonaqueous solvent containing γ-butyrolactone, an electrolyte dissolved in the nonaqueous solvent and a macromolecular material comprising the structure represented by the formula:

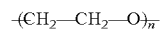

wherein n≧1, which is added to the nonaqueous solvent, the content of the macromolecular material being 0.01% or more but less than 10% by weight.

There is further provided a nonaqueous liquid electrolyte secondary battery comprising a positive electrode containing an active material, a negative electrode containing a material which absorbs and desorbs lithium ions and a liquid electrolyte sandwiched between the positive and negative electrodes, wherein a macromolecular material which, added in an amount of 0.01% or more but less than 10% by weight, brings the viscosity of the nonaqueous liquid electrolyte at 20° C. within the range of 7 cP to 30,000 cP is added to the nonaqueous liquid solvent.

There is also provided a nonaqueous liquid electrolyte secondary battery comprising a positive electrode containing an active material, a negative electrode containing a material which absorbs and desorbs lithium ions and a liquid electrolyte sandwiched between the positive and negative electrodes, wherein the nonaqueous liquid electrolyte consists of a nonaqueous solvent, an electrolyte dissolved in the nonaqueous solvent and a macromolecular material added to the nonaqueous solvent, and the nonaqueous liquid electrolyte at 20° C. is a fluid which exhibits non-Newtonian properties.

There is finally provided a nonaqueous liquid electrolyte secondary battery comprising a positive electrode containing an active material, a negative electrode containing a material which absorbs and desorbs lithium ions and a liquid electro- lyte sandwiched between the positive and negative electrodes, wherein the ratio of ion conductivity a ($10^{-3}$ S/cm) to viscosity η (cP), p (σ/η), in the nonaqueous liquid electrolyte at 20° C. is <0.1.

The inventors thought that the leakage of medium from a battery could be prevented by using a high viscosity, nonaqueous liquid electrolyte as an ion conducting material instead of using a gel-like electrolyte and, as a result of intensive research, have found out that the viscosity of a nonaqueous liquid electrolyte can be extremely increased by adding a few % by weight of polyethylene oxide to the nonaqueous liquid electrolyte which uses γ-butyrolactone as a nonaqueous solvent. In other words, they have found out that by adding to the nonaqueous liquid electrolyte a small amount of macromolecular material as appropriately selected depending on the nonaqueous solvent, it will be possible to increase the viscosity of the nonaqueous liquid electrolyte and, consequently, to prevent the leakage of the nonaqueous liquid electrolyte from the battery while inhibiting the movement of the electrolyte in the nonaqueous liquid electrolyte and improving the characteristics of the nonaqueous liquid electrolyte secondary battery.

In the light of a problem that since the liquid electrolyte conventionally used has been a fluid which exhibits non-Newtonian properties, an uneven distribution of the electrolyte occurs within a battery during cycles, involving the distortion of its electrodes, the inventors have further found out that by using a high viscosity, nonaqueous liquid electrolyte, specifically, a fluid which exhibits non-Newtonian properties at 20° C., the electrolyte can be distributed evenly within a nonaqueous liquid electrode secondary battery during cycles and the distortion of its electrodes can be suppressed.

As such a non-Newtonian fluid, the one corresponding to any of the models below is particularly desirable:

1) Bingham Model

This is a fluid in which deformation of the fluid occurs when the shear stress τ across the fluid is larger than the yield stress τy, and a relationship is established between τ and the shear rate of the fluid, γ, as:

$\tau = \tau y + \eta_0 \gamma = \tau y + \eta_0 du/dy$, when τ>τy $\gamma = du/dy = 0$, when τ>τy.

2) Power Law Model

This is a fluid in which a relationship is established as:

$\tau = K\gamma^n = K(du/dy)^n$.

Designate a fluid with n>1 a dilatant fluid and a fluid with n<1 a pseudoplastic fluid. When n<1, the greater γ is, the gentler the slope between the shear stress τ and the shear rate γ is. A power law fluid with n<1 is designated a pseudoplastic fluid since the flow curve is approximated in the region where γ is great and, at γ=0, apparent plasticity which is finite shear stress appears.

3) Herschel-Bulkey Model

This is a combination of Bingham and power law models, as represented by:

$\tau = \tau y + K\gamma^n = \tau y + K(du/dy)^n$.

In addition, for a non-Newtonian fluid, the apparent viscosity is assigned to a case where it decreases with the increase in the shear rate (shear thinning) and a case where it increases with the increase in the shear rate (shear thickening). In the nonaqueous liquid electrolyte according to the present invention, it should preferably be shear thinning wherein it decreases with the increase in the shear rate. It should also desirably be a Bingham plastic fluid or a pseudoplastic fluid (a power law fluid with n<1).

In addition, since conventionally used liquid electrolytes are low viscosity fluids, which tend to be offset within batteries during cycles, there has been a disadvantage of uneven reactions on electrodes. That disadvantage is attributable to the fact that in a lithium ion battery using a conventional organic liquid electrolyte, increasing the ion conductivity σ ($10^{-3}$ S/cm) of the liquid electrolyte while decreasing the viscosity η (cP), that is, increasing the ratio between them, p (σ/η), has been supposed to be a factor for improving the battery characteristics.

Based on a consideration that uniform reactions are made possible on electrodes by using a high viscosity, nonaqueous liquid electrolyte having a high ion conductivity, the inventors have found out that by developing a nonaqueous liquid electrolyte secondary battery having a nonaqueous liquid electrolyte with a ratio of the ion conductivity σ ($10^{-3}$ S/cm) to the viscosity η (cP), p (σ/η), of <0.1, it is possible to cause uniform reactions on the electrodes and to remarkably suppress the reaction resistance. The range of p should desirably be 0.0001 or more but less than 0.1, preferably 0.0005 to 0.08 and more preferably 0.001 to 0.05.

A nonaqueous liquid electrolyte secondary battery according to the present invention will now be described in more detail below.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE INVENTION

Figure 1:
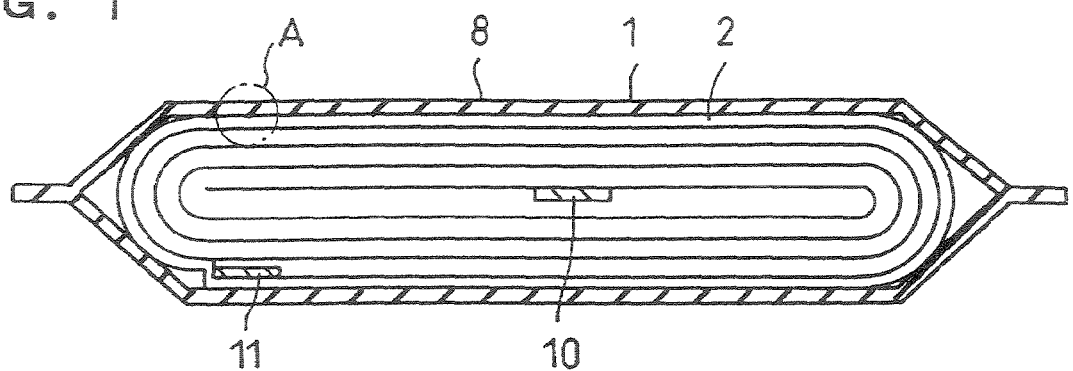
FIG. 1 is a sectional view of a thin, lithium ion battery illustrating an embodiment of a nonaqueous liquid electrolyte secondary battery according the present invention.

As shown in FIG. 1, a nonaqueous liquid electrolyte secondary battery according to the present invention comprises an outer packaging material 1 made of a film for example and an electrode assembly 2 (a group of electrodes) enclosed by the outer packaging material. The electrode assembly 2 has a construction in which a laminate consisting of positive electrodes, separators and negative electrodes is spirally wound into a flattened shape.

Figure 2:
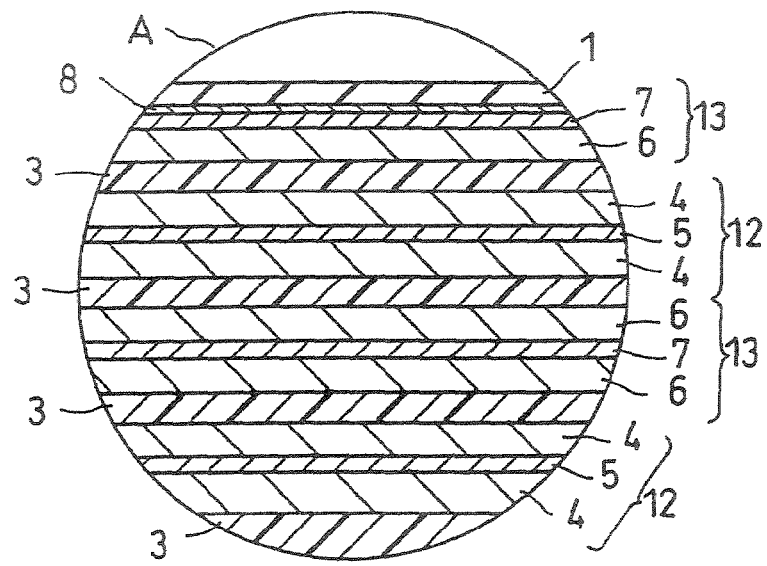
FIG. 2 is an enlarged section of portion A taken from FIG. 1.

As shown in FIG. 2, the electrode assembly 2 wound into the flattened shape consists of a separator 3, a positive electrode 12, another separator 3, a negative electrode 13, another separator 3, another positive electrode 12, another separator 3 and another negative electrode, which are stacked in this order from below as seen in the drawing.

Each of the negative electrodes 13 has a three layer construction in which a negative electrode layer 6, a negative electrode collector 7 and another negative electrode layer 6 are stacked in this order while each of the positive electrodes 12 has a three layer construction in which a positive electrode layer 4, a positive electrode collector 5 and another positive electrode layer 4 are stacked in this order. The outermost negative electrode 13, however, has a two layer construction of a negative electrode layer 6 and a negative electrode collector 7 as referred to from below in the drawing and, at the outermost side, the negative electrode collector 7 is attached to the outer packaging material 1 via an adhesive layer 8. A nonaqueous liquid electrolyte is injected into the outer packaging material 1 and retained in the separators.

A strip-like positive electrode lead 10 has one end which is connected to the positive electrode collector 5 of the electrode assembly 2 and the other end which extends out of the outer packaging material 1. On the other hand, a strip-like negative electrode lead 11 has one end which is connected to the negative electrode collector 7 of the electrode assembly 2 and the other end which extends out of the outer packaging material 1. The thin, nonaqueous liquid electrolyte secondary battery can be produced by accommodating the electrode assembly as such in the outer packaging material followed by injecting a nonaqueous liquid electrolyte before sealing the opening, etc.

Each component of such a nonaqueous liquid electrolyte secondary battery will then be described in more detail below.

(1) The Positive Electrode

The positive electrode has a collector for positive electrode and a positive electrode layer formed on one or both sides of the collector. As the collector, a conductive substrate of a porous structure or a nonporous conductive substrate may be used. Such conductive substrates may be formed of aluminum, stainless steel or nickel, for example.

The positive electrode layers contain a positive electrode active material, and are usually formed of a composite material further containing a conductor agent and a binder resin. As the positive electrode active material, various kinds of oxides, such as manganese dioxide, lithium/manganese composite oxide, lithium-containing nickel oxide, lithium-containing cobalt oxide, lithium-containing nickel cobalt oxide, lithium-containing iron oxide and lithium-containing vanadium oxide as well as chalcogen compounds such as titanium disulfide and molybdenum disulfide may be mentioned. Among those mentioned, lithium-containing cobalt oxide such as $LiCoO_2$, lithium-containing nickel cobalt oxide such as $LiNi_{0.8}Co_{0.2}O_2$ and lithium/manganese composite oxide such as $LiMn_2O_4$ and $LiMnO_2$ are preferable for their ability to obtain a high voltage.

As the conductor agent, acetylene black, carbon black, graphite, etc. may be mentioned, for example. The binder functions to retain the active material on the collector and to connect the active material with each other. As the binder, polytetrafluoroethylene (PTFE), polyvinylidene fluoride (PVdF), ethylene-propylene-diene copolymer (EPDM), styrene-butadiene rubber (SBR), etc. can be employed, for example. The mixing ratios of the positive electrode active material, conductor agent and binder should preferably be 80% to 95% by weight, 3% to 20% by weight and 2% to 7% by weight, respectively.

(2) The Negative Electrode

The negative electrode has a collector for negative electrode and a negative electrode layer formed on one or both sides of the collector. As the collector for negative electrode, a conductive substrate of a porous structure or a nonporous conductive substrate may be used. Such conductive substrates may be formed of copper, stainless steel or nickel, for example.

The negative electrode layer contains a material which is capable of absorbing or desorbing lithium ions, and is usually formed of a composite material further containing a conductor agent and a binder resin. As the material which is capable of absorbing or desorbing lithium ions, a graphitic or carbonaceous material, such as graphite, coke, a carbon fiber, a globular fiber or the like as well as a graphitic or carbonaceous material which is obtainable by heat treating a thermoplastic resin, isotropic pitch, mesophase pitch, mesophase pitch-based carbon fiber, mesophase globule or the like (in particular, a mesophase pitch-based carbon fiber is preferable for its ability to improve capacity and charge/discharge cycle characteristics) at 500 to 3,000° C. etc. may be mentioned. Among those mentioned, a graphitic material which is obtained by increasing the temperature for the aforementioned heat treatment to 2,000° C. or higher and has graphite crystals whose interplanar spacing $d_{002}$ of (002) planes is 0.340 nm or less should preferably be used. A nonaqueous liquid electrode secondary battery having a negative electrode which contains such a graphitic material as a carbonaceous material can considerably increase the battery capacity and the bulk current discharge characteristics. More preferably, the spacing $d_{002}$ is 0.336 nm or less.

As the material which absorbs and desorbs lithium ions, a metal such as aluminum, magnesium, tin, silicon etc., a metal compound selected from metal oxides, metal sulfides and metal nitrides or a material containing a lithium alloy may also be suitable. As the metal oxide, tin oxide, silicon oxide, lithium titanium oxide, niobium oxide, tungsten oxide, etc. may be mentioned. As the metal sulfide, tin sulfide, titanium sulfide, etc. may be mentioned, for example. As the metal nitride, lithium cobalt nitride, lithium iron nitride, lithium manganese nitride, etc. may be mentioned, for example.

As the lithium alloy, lithium/aluminum alloy, lithium/tin alloy, lithium/lead alloy, lithium/silicon alloy, etc. may be mentioned, for example.

As the binder, polytetrafluoroethylene (PTFE), polyvinylidene fluoride (PVdF), ethylene-propylene-diene copolymer (EPDM), styrene-butadiene rubber (SBR), carboxymethyl cellulose (CMC), etc may be employed, for example.

The mixing ratio of the carbonaceous material and the binder should preferably be 90% to 98% by weight for the carbonaceous material and 2% to 20% by weight for the binder.

(3) The Separator

The separator is for preventing short-circuiting between the positive and negative electrodes, and is formed of an insulating material. A nonaqueous liquid electrolyte is retained in the separator and a porous sheet provided with pores is used so that lithium ions can move between the electrodes.

As the porous sheet, a porous film or a non-woven fabric may be used, for example. The porous sheet should preferably be made of at least one material selected from polyolefins and celluloses, for example. As the polyolefins, polyethylene and polypropylene may be mentioned, for example. Among those mentioned, a porous film made of polyethylene, polypropylene or both is preferable for its ability to improve the safety of secondary batteries.

The thickness of the porous sheet should preferably be 30 μm or less. If the thickness exceeds 30 μm, then it may disadvantageously increase the spacing between the positive and negative electrodes, thereby enlarging the internal resistance. The lower limit of the thickness should preferably be 5 μm. If the thickness is less than 5 μm, then the strength of the separator may remarkably decrease, thereby increasing the possibility of causing internal short-circuiting. The upper limit of the thickness should more preferably be 25 μm while the lower limit of the thickness should more preferably be 10 μm.

As the porous sheet, a porous material having a porosity in the range of 30% to 60% should desirably be used. When the porosity is less than 30%, the amount of liquid electrolyte to be retained within the porous sheet will lessen, thereby decreasing the ion conductivity. If the porosity exceeds 60%, the mechanical strength will then be insufficient.

When a gel-like electrolyte is used as an ion conducting material, the gel-like electrolyte must directly be sandwiched between electrodes since it is difficult to form a gel-like electrolyte within pores of a porous material. When a nonaqueous liquid electrolyte is used as an ion conducting material, however, the electrolyte can be retained within the pores of the mechanically strong porous material. As such, short-circuiting between electrodes, etc. can be prevented (4) The Nonaqueous Liquid Electrolyte The nonaqueous liquid electrolyte has a nonaqueous solvent and an electrolyte and macromolecular material both dissolved in the nonaqueous liquid electrolyte.

4-1) The Electrolyte

As the electrolyte to be incorporated into the nonaqueous liquid electrolyte, a lithium salt (electrolyte) such as lithium perchlorate ($LiClO_4$), lithium hexafluorophosphate ($LiPF_6$), lithium borofluoride ($LiBF_4$), lithium hexafluoroarsenide ($LiAsF_6$), lithium trifluorometasulfonate ($LiCF_3SO_3$), bis-trifluoromethyl sulfonylimide lithium [$LiN(CF_3SO_2)_2$], etc. may be mentioned, for example. Among those mentioned, it is preferable to use either $LiPF_6$ or $LiBF_4$. The content of such electrolytes dissolved in the nonaqueous solvent should desirably be 0.5 to 2.0 mol/l.

4-2) The Nonaqueous Solvent

The nonaqueous solvent is selected depending on the macromolecular material used and can be improved in its viscosity by adding a small amount of the selected macromolecular material. For instance, the nonaqueous solvent in case polyethylene oxide is used as the macromolecular material will be described. For the nonaqueous solvent, an organic solvent containing γ-butyrolactone (BL) is to be used. Although BL alone can be used as the nonaqueous solvent, it is preferable to use a mixed nonaqueous solvent consisting mainly of BL. Specifically, it is preferable to use a mixed nonaqueous solvent containing 50% to 95% by volume of BL.

If the ratio of BL in the nonaqueous solvent is less than 50% by volume, a gas may then tend to be generated at a high temperature. If the ratio of BL exceeds 95% by volume, a reaction will then occur between the negative electrode and BL, thereby decreasing the charge/discharge cycle characteristics. When a carbonaceous material is used for the negative electrode, for example, the carbonaceous material will react with BL to cause a reductive decomposition of the nonaqueous liquid electrolyte, forming on the surface of the negative electrode a coating which inhibits the charge/discharge reactions Consequently, electric current tends to concentrate on the negative electrode so that lithium metal may deposit on the surface of the negative electrode or the impedance over the interface of the negative electrode may increase, thereby reducing the charge/discharge efficiency of the negative electrode and deteriorating the charge/discharge cycle characteristics.

A more preferable ratio of BL in the nonaqueous solvent is 60% to 95% by volume. Bringing it within this range can further enhance the effect of inhibiting gas generation during storage at a high temperature and can further improve the discharge capacity under a low temperature environment at around −20° C. An even more preferable ratio is 65% to 90% by volume. As the nonaqueous solvent to be mixed with BL, a cyclic carbonate is desirable for its ability to improve the charge/discharge efficiency of the negative electrode. It may further include a low viscosity solvent such as a chain carbonate, chain ether, cyclic ether, etc. in an amount of 20% by volume or less.

As the cyclic carbonate, propylene carbonate (PC), ethylene carbonate (EC), vinylene carbonate (VC), trifluoropropylene carbonate (TFPC), etc. are desirable. In particular, when EC is used as a solvent to be mixed with BL, the charge/discharge characteristics and the bulk current discharge characteristics can be greatly improved. As other solvents to be mixed with BL, mixed solvents of a third solvent consisting of at least one selected from the group consisting of PC, VC, TFPC, diethyl carbonate (DEC), methylethyl carbonate (MEC) and aromatic compounds and EC would be desirable for their ability to improve the charge/discharge cycle characteristics.

More specific examples of the composition of the mixed nonaqueous solvent are BL and EC; BL and PC; BL, EC and DEC; BL, EC and MEC; BL, EC, MEC and VC; BL, EC and VC; BL, PC and VC; and BL, EC, PC and VC.

When the mixed nonaqueous solvent of EL and EC is used, the volume ratio of EC should preferably be 5% to 40% by volume. If the ratio of EC is less than 5% by volume, it may be difficult to cover the surface of the negative electrode closely with a protective film, so that a reaction between the negative electrode and BL may occur, thus making it difficult to sufficiently improve the charge/discharge cycle characteristics. If the ratio of EC exceeds 40% by volume, on the other hand, the viscosity of the nonaqueous liquid electrolyte may increase to decrease the ion conductivity, so that it may become difficult to sufficiently improve the charge/discharge cycle characteristics, bulk current discharge characteristics and low temperature discharge characteristics. A more preferable range of the ratio of EC is 10% to 35% by volume.

When at least one selected from DEC, MEC, PC and VC is used as a component of the mixed nonaqueous solvent, it will have the effect of forming a close protective film over the surface of the negative electrode and thereby decreasing the interface impedance of the negative electrode. The amount of this solvent is not particularly limited and is to be defined at such an amount that this effect may occur. If the ratio of these components in the mixed nonaqueous solvent exceeds 10% by volume, however, it may be difficult to sufficiently inhibit the oxidative decomposition of the nonaqueous liquid electrolyte under a high temperature environment or the viscosity of the nonaqueous liquid electrolyte may increase to decrease the ion conductivity. With this in mind, the ratio by volume of these components in the mixed nonaqueous solvent should desirably be 10% by volume or less. A more preferable ratio by volume is 2% by volume or less. The lower limit of the ratio by volume should preferably be 0.001% by volume and more preferably 0.05% by volume.

Among the compositions of the aforementioned mixed nonaqueous solvents, in particular, a mixed nonaqueous solvent which comprises more than 50% but up to 95% by volume of BL and additive amounts of EC and VC is preferable. A nonaqueous liquid electrolyte secondary battery having a nonaqueous liquid electrolyte comprising this nonaqueous solvent and a negative electrode comprising a carbonaceous material which absorbs and desorbs lithium ions can largely decrease the impedance over the interface of the negative electrode and suppress the deposition of lithium ions on the negative electrode, thereby improving the charge/discharge efficiency of the negative electrode. Consequently, gas generation at high temperature storage can be inhibited to suppress the deformation of the outer packaging material while realizing excellent bulk current discharge characteristics and a long life. Such improvement of the negative electrode characteristics may assumedly be due the effects as described below. In the aforementioned secondary battery, the surface of the negative electrode is covered with a protective film by EC and, in addition, a thin, close coating is formed by VC. It is consequently assumed that any reactions between BL and the negative electrode can further be suppressed so that the reduction of impedance and the prevention of the deposition of lithium metal can be attained.

In addition, as the nonaqueous solvent, a mixed nonaqueous solvent which comprises more than 50% but up to 95% by volume of BL and additive amounts of EC and an aromatic compound may be used in place of one having the aforementioned composition. As the aforementioned aromatic compounds, at least one selected from benzene, toluene, the xylenes, biphenyl and terphenyl may be mentioned, for example. EC can attach to the surface of the negative electrode (for example, one containing a carbonaceous material which absorbs and desorbs lithium ions) and form a protective film to inhibit a reaction between the negative electrode and BL. The ratio by volume of EC should then preferably be 5% to 40% by volume, for the same reasons as described above. A more preferable range for the ratio of EC is 10% to 35% by volume. In the meantime, the benzene rings of the aforementioned aromatic compounds can easily adsorb to the surface of the negative electrode (for example, one containing a carbonaceous material which absorbs and desorbs lithium ions) to therefore inhibit a reaction between the negative electrode and BL. Thus, the nonaqueous liquid electrolyte containing the nonaqueous solvent comprising more than 50% but up to 95% by volume of BL as well as EC and an aromatic compound can sufficiently inhibit reactions between the negative electrode and BL, thereby improving the charge/discharge cycle characteristics of a secondary battery.

When DEC, MEC, PC, TFPC or VC is included as a component of the mixed nonaqueous solvent, the charge/discharge cycle characteristics can further be improved, since it may further inhibit reactions between the negative electrode and BL. VC is preferable among them. The amount of the third solvent consisting of at least one selected from aromatic compounds, DEC, MEC, PC, TFPC and VC is not particularly limited and is to be defined at such an amount that this effect may occur. If the ratio of the third solvent in the nonaqueous solvent exceeds 10% by volume, however, it may be difficult to sufficiently inhibit the oxidative decomposition of the nonaqueous liquid electrolyte under a high temperature environment or the viscosity of the nonaqueous liquid electrolyte may increase to decrease the ion conductivity. With this in mind, the ratio by volume of the third solvent in the nonaqueous solvent should desirably be 10% by volume or less. A more preferable ratio by volume is 2% by volume or less. The lower limit of the ratio by volume should preferably be 0.001% by volume and more preferably 0.05% by volume.

4-3) The Macromolecular Material

The macromolecular material dissolves in the nonaqueous solvent to maintain a high lithium ion conductivity and improve the viscosity of the nonaqueous liquid electrolyte obtained. The polyacrylonitrile (PAN) series, polyacrylate (PMMA) series, polyvinylidene fluoride (PVdF) series, polyvinyl chloride (PVC) series, polyethylene oxide series, etc. may be used. Depending on the type of the nonaqueous solvent in which they are dissolved, however, the degree of increase in viscosity relative to the amount dissolved will differ. When an organic solvent containing BL as a nonaqueous solvent is used, it is preferable to use a macromolecule of the PEO series comprising the structure represented by the formula:

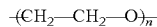

wherein $n \geq 1$.

Since the PEO series macromolecule, dissolved in BL in a slight amount, can remarkably increase the viscosity of the nonaqueous liquid electrolyte obtained, not only the movement of the electrolyte in the liquid electrolyte by a macromolecular material does not have to be impaired but, since it exists evenly throughout the nonaqueous liquid electrolyte, the ion conductivity may also be improved further.

The PEO series macromolecule should preferably be present in an amount of 0.01% or more but less than 10% by weight, on the basis of the aforementioned nonaqueous liquid electrolyte containing BL. If the amount of the PEO series macromolecule is less than 0.01% by weight, it will then be likely that the nonaqueous liquid electrolyte leaks out through the outer packaging material. If the amount of the PEO macromolecule is 10% by weight or more, on the other hand, the lithium ion conductivity of the secondary battery will then remarkably decrease, making it difficult to improve the discharge capacity, bulk current discharge characteristics and charge/discharge cycle characteristics. The range of n should preferably be $2 \times 10^1 \leq n \leq 2 \times 10^6$ and more preferably $1 \times 10^2 \leq n \leq 1 \times 10^6$.

The amount of the nonaqueous liquid electrolyte should preferably be 0.2 to 0.6 g per 100 mA of battery unit capacity, for the reasons such as below. If the amount of the nonaqueous liquid electrolyte is less than 0.2 g/100 mAh, then it may not be possible to maintain a sufficient ion conductivity across the positive and negative electrodes. If the amount of the nonaqueous liquid electrolyte exceeds 0.6 g/100 mAh, on the other hand, the amount of the electrolyte will be so large that it may become difficult to seal with an outer packaging material made of a film. A more preferable range of the amount of the nonaqueous liquid electrolyte is 0.4 to 0.55 g/100 mAh.

The average molecular weight of the macromolecular material should preferably be in the range of $1 \times 10^3$ to $1 \times 10^8$. Outside this range, it may be impossible to enhance the viscosity of the nonaqueous liquid electrolyte with the addition in a small amount of the macromolecular material.

Thus, adding a macromolecular material will bring the viscosity of the liquid electrolyte obtained within the range of 7 cP to 30,000 cP. If the viscosity of the liquid electrolyte is lower than 7 cP, the liquid electrolyte may then leak out through the outer packaging material and if it is higher than 30,000 cP, it will then be difficult to impregnate the separator with the liquid electrolyte.

By increasing the viscosity of the liquid electrolyte, deformation of the electrode assembly which occurs when charging and discharging are repeated may be prevented and, in turn, by preventing such deformation, swelling of the outer packaging may be reduced and the capacity retention ratio may be improved.

(5) The Outer Packaging Material

As the outer packaging material, a sheet comprising a metal layer and resin layers coated on both sides of the metal layer, 0.5 mm or less in thickness including the resin layers, is used. This outer packaging material is light in weight so that the energy density may be increased per weight of battery; however, it is susceptible, because of its flexibility, to deformation due to gases generated from the electrode assembly and the nonaqueous liquid electrolyte.

The resin layers act as protective layers for the metal layer and may be formed of, for example, polyethylene, polypropylene, etc. The metal layer is responsible for shutting off moisture. As the metal layer, aluminum, stainless steel, iron, copper, nickel, etc. may be mentioned, for example. Among those mentioned, aluminum which is light in weight and effective in shutting off moisture is preferable. The metal layer may be formed of one metal or may be formed of two or more metals integrated into a layer. Of the resin layers formed on both sides of the metal layer, one provided on the outside of the battery is responsible for preventing damages to the metal layer. This outer resin layer may be formed of one resin or may be formed of two or more resins. The other resin layer provided on the inside of the battery is responsible for preventing the metal layer from being corroded by the nonaqueous liquid electrolyte. This inner resin layer may be formed of one resin or may be formed of two or more resins.

If the thickness of the outer packaging material exceeds 0.5 mm, the capacity per weight of battery will then decrease. The thickness of the outer packaging material should preferably be 0.3 mm or less, more preferably 0.25 mm or less and most preferably 0.15 mm or less. If the thickness is less than 0.05 mm, deformation or breakage will then tend to occur. Thus, the lower limit of the thickness should preferably be 0.05 mm. The lower limit should more preferably be 0.08 mm and most preferably 0.1 mm.

The thickness of the outer packaging material is to be measured by the method to be described below. Specifically, three points mutually separated by 1 cm or more over the area of the outer packaging material except where the seal of the material is made are selected at random, a thickness is measured at each point and the average is calculated and referred to as the thickness of the outer packaging material. If any foreign matters (resin, for example) are attached on the surface of the outer packaging material, such matters must then be removed before taking measurement of the thickness.

After assembling such a lithium ion secondary battery, an initial charge is carried out at a charge rate of 0.05 C to 0.5 C under a temperature condition of 30° C. to 80° C. Under these conditions, the charge may be carried out for only one cycle or may be carried out for 2 or more cycles. The battery may be stored for 1 to 100 hours under a temperature condition of 30° C. to 80° C. before charging. 1 C charge rate herein refers to the current value required to charge a nominal capacity (Ah) in one hour.

The temperature during the initial charge is to be set within the aforementioned range for the following reasons. If the initial charge temperature is below 30° C., it will then be difficult to impregnate the positive and negative electrodes and the separator evenly with the nonaqueous liquid electrolyte since the viscosity of the nonaqueous liquid electrolyte remains high, so that the internal impedance will increase and the utilization of the active material will decrease. If the initial charge temperature exceeds 80° C., the binder contained in the positive and negative electrodes will then deteriorate.

By bringing the charge rate for the initial charge within the range of 0.05 C to 0.5 C, it is possible to moderately delay the expansion of the positive and negative electrodes by charging so that the positive and negative electrodes may be infiltrated evenly with the nonaqueous liquid electrolyte.

EXAMPLES

Example 1

(Fabrication of Positive Electrode)

First, 92% by weight of lithium cobalt oxide ($Li_xCoO_2$, wherein $0 \leq X \leq 1$) powder, 3% by weight of acetylene black, 3% by weight of graphite and 2% by weight of ethylene-propylene-diene monomer powder were mixed together with toluene and then the mixture was applied to both sides of a current collector made of a porous aluminum foil (15 μm in thickness) having pores 0.5 mm in diameter at a concentration of 10 pores per 10 cm², followed by press-working, to produce a positive electrode having an electrode density of 3.2 g/cm³ in which positive electrode layers were carried on both sides of the collector.

(Fabrication of Negative Electrode)

95% by weight of mesophase pitch-based carbon fiber (fiber diameter 8 μm, average fiber length 18 μm and average interplanar spacing ($d_{002}$) 0.3360 nm) powder as a carbonaceous material was mixed with 5% by weight of polyvinylidene fluoride (PVdF) as a binder and the mixture was applied to a current collector made of a copper foil (15 μm in thickness), dried and press-worked to produce a negative electrode having an electrode density of 1.7 g/cm³ in which negative electrode layers were carried on both sides of the collector.

(Separator)

A separator, 20 μm in thickness, 20% in heat shrinkage at 120° C. for 1.5 hours and 55% in porosity, consisting of a porous film made of polyethylene was provided.

(Preparation of Nonaqueous Liquid Electrolyte)

Into a mixed solvent of ethylene carbonate (EC) and γ-butyrolactone (volume ratio 25:75) 1.5 mol/l of lithium borofluoride ($LiBF_4$) was dissolved to prepare a nonaqueous liquid electrolyte. Then, 0.7% by weight, on the basis of the nonaqueous liquid electrolyte, of polyethylene oxide having a molecular weight of 5,000,000 was added with stirring to the liquid electrolyte to prepare a nonaqueous liquid electrolyte.

(Fabrication of Electrode Assembly)

A strip-like positive electrode lead was welded to the collector of the positive electrode and a strip-like negative electrode lead was welded to the collector of the negative electrode. Then, the positive and negative electrodes were spirally wound with the separator between them, followed by shaping into a flattened form to fabricate an electrode assembly.

A laminated film, 90 μm in thickness, made of an aluminum foil covered on both sides with polypropylene was shaped into a sack, into which the electrode assembly was accommodated in such a manner that the laminated surface shown in FIG. 2 could be seen through the opening of the sack.

The nonaqueous liquid electrolyte was injected into the electrode assembly in the laminated film so that the amount reached 4.5 g per Ah of battery capacity to assemble a thin, nonaqueous liquid electrolyte secondary battery, 3 mm in thickness, 40 mm in width and 70 mm in height, constructed as shown in FIGS. 1 and 2.

This nonaqueous liquid electrolyte secondary battery was subjected to an initial charge process by the following procedure. First, the battery was left standing at a high temperature environment at 45° C. for 2 hours and then, under the same environment, charged up to 4.2 V at 0.2 C (120 mA) with a constant current and voltage for 15 hours. Thereafter, it was discharged down to 3.0 V at 0.2 C and again charged for the second cycle under the same conditions as the first cycle to produce a nonaqueous liquid electrolyte secondary battery.

In order to investigate the charge/discharge cycle characteristics of the nonaqueous liquid electrolyte secondary battery obtained, cycles each consisting of charging up to 4.2 V at 1 C rate with a constant current and voltage at 45° C. for 3 hours and discharging down to 2.7 V at 1 C rate were repeated and the capacity retention ratio after 300 cycles was measured. The characteristics of the battery for Example 1 are shown in Table 1, wherein viscosity (cP) refers to a value at 20° C. The battery thickness at the first cycle is referred to as a reference and the increase in thickness of the outer packaging at 800th cycle is presented in Table 1

Examples 2 to 9

The same procedure as that of Example 1 was followed, except that the amount, molecular weight and viscosity of the macromolecules to be added to the liquid electrolyte were altered as shown in Table 1, to prepare a thin, nonaqueous liquid electrolyte secondary battery for making evaluations. The characteristics of the battery for each Example are shown in Table 1.

Comparative Example 1

The same procedure as that of Example 1 was followed, except that a mixed solvent of BL and EC (volume ratio 75:25) to which 1.5 mol/l of $LiBF_4$ was dissolved was used for the nonaqueous liquid electrolyte, to prepare a thin, nonaqueous liquid electrolyte secondary battery for making evaluations. The characteristics of the battery for Comparative Example 1 are shown in Table 1.

TABLE 1

| | Molecular weight | Amount (% by weight) | Viscosity (cP) | Capacity retention ratio (%) | Increase in thickness of outer packaging (mm) |
|---|---|---|---|---|---|
| Example 1 | $5 \times 10^6$ | 0.7 | 1100 | 85 | 0.25 |
| Example 2 | $5 \times 10^6$ | 5 | 20000 | 90 | 0.21 |
| Example 3 | $1 \times 10^7$ | 0.01 | 5000 | 88 | 0.23 |
| Example 4 | $1 \times 10^3$ | 9 | 60 | 80 | 0.7 |
| Example 5 | $3 \times 10^3$ | 0.05 | 7 | 50 | 0.8 |
| Example 6 | $8 \times 10^5$ | 6 | 500 | 84 | 0.35 |
| Example 7 | $9 \times 10^7$ | 0.9 | 30000 | 93 | 0.15 |
| Example 8 | $1 \times 10^6$ | 0.1 | 700 | 85 | 0.32 |
| Example 9 | $5 \times 10^4$ | 2 | 200 | 82 | 0.38 |
| Comparative Example 1 | — | — | 6.6 | 15 | 0.95 |

As apparent from Table 1, the batteries according to Examples 1 to 9 each having a nonaqueous liquid electrolyte containing a nonaqueous solvent to which macromolecules were added to increase the viscosity of the liquid electrolyte can remarkably improve the capacity retention ratio after 300 cycles at 45° C. In addition, in Examples 1 to 9, a load of 300 kg per cell was applied, to show that no leakage of the nonaqueous liquid electrolyte from the obtained nonaqueous liquid electrolyte secondary battery was observed.

Furthermore, it is shown that swelling of the outer packaging is suppressed, meaning there is very little deformation of the electrode assembly. The deformation of electrodes is supposed to be one of the causes influencing the capacity retention ratio and, in these Examples, the capacity retention ratio is higher when the viscosity is higher.

Example 10

This Example used the same battery construction as Example 1 except the preparation of nonaqueous liquid electrolyte.

(Preparation of Nonaqueous Liquid Electrolyte)

Into a mixed solution of ethylene carbonate (EC) and γ-butyrolactone (BL) (volume ratio 25:75) 1.5 mol/l of lithium borofluoride ($LiBF_4$) was dissolved to prepare a nonaqueous liquid electrolyte. Then, 1% by weight, on the basis of the nonaqueous liquid electrolyte, of polyethylene oxide having a molecular weight of 4,000,000 was added with stirring to the liquid electrolyte to prepare a nonaqueous liquid electrolyte.

This nonaqueous liquid electrolyte showed a decrease in its viscosity according to the increase of shear rate at 20° C. Specifically, the viscosity was 1,000 cP when the shear rate was 20 S and decreased down to 300 cP when the shear rate was 150 S.

In order to investigate the change ratio in battery thickness before and after charge/discharge cycles in the nonaqueous liquid electrolyte secondary battery obtained, cycles each consisting of charging up to 4.2 V at 2 C rate with a constant current and voltage at 45° C. for 3 hours and discharging down to 3.0 V at 1 C rate were repeated and the thickness of the battery after 500 cycles was measured as $d_{500}$ and the change ratio in battery thickness was measured as $(d_{500}-d_0)/d$. The capacity retention ratio was also measured. The change ratio in battery thickness for Example 10 is shown in Table 2.

Examples 11 to 16

The same procedure as that of Example 8 was followed, except that the molecular weight and viscosity of the macromolecules to be added to the liquid electrolyte were altered as shown in Table 2, the amount remaining the same, to prepare a thin, nonaqueous liquid electrolyte secondary battery for making evaluations. The characteristics of the battery for each Example are shown in Table 2.

Comparative Example 2

The same procedure as that of Example 10 was followed, except that a mixed solvent of BL and EC (volume ratio 75:25) to which 1.5 mol/l of $LiBF_4$ was dissolved was used for the nonaqueous liquid electrolyte, to prepare a thin, nonaqueous liquid electrolyte secondary battery for making evaluations. The characteristics of the battery for Comparative Example 2 are shown in Table 2.

TABLE 2

| | Apparent viscosity (cP) | Shear rate ($S^{-1}$) | Average molecular weight | $(d_{500} - d_0)/d_0$ |
|---|---|---|---|---|
| Example 10 | 2000 | 150 | $4 \times 10^6$ | 4.1 |
| Example 11 | 150 | 250 | $9.7 \times 10^8$ | 2.3 |
| Example 12 | 7 | 1000 | $8.6 \times 10^3$ | 6.1 |
| Example 13 | 50 | 500 | $4.5 \times 10^4$ | 5.4 |
| Example 14 | 1000 | 100 | $6.2 \times 10^7$ | 3.3 |
| Example 15 | 8000 | 70 | $7.1 \times 10^5$ | 3.4 |
| Example 16 | 10000 | 20 | $3.4 \times 10^6$ | 2.1 |
| Comparative Example 2 | 6.6 | 350 | — | 36 |

As apparent from Table 2, the secondary batteries according to Examples 10 to 16 each having a nonaqueous liquid electrolyte containing a nonaqueous solvent to which macromolecules were added to increase the viscosity of the liquid electrolyte can remarkably reduce the change in thickness of the batteries after 500 cycles at 45° C.

Example 17

This Example used the same battery construction as that of Example 1 except the preparation of nonaqueous liquid electrolyte.

(Preparation of Nonaqueous Liquid Electrolyte)

Into a mixed solvent of ethylene carbonate (EC) and γ-butyrolactone (BL) (volume ratio 25:75) 2.5 mol/l of lithium borofluoride (LiBF$_4$) was dissolved to prepare a nonaqueous liquid electrolyte. Then, 0.5% by weight, on the basis of the nonaqueous liquid electrolyte, of polyethylene oxide having a molecular weight of 7,000,000 was added with stirring to the liquid electrolyte to prepare a nonaqueous electrolyte.

(Preparation of Electrode Assembly)

A strip-like positive electrode lead was welded to the collector of the positive electrode and a strip-like negative electrode lead was welded to the collector of the negative electrode. Then, the positive and negative electrodes were spirally wound with the separator between them, followed by shaping into a flattened form to fabricate an electrode assembly. A laminated film, 90 μm in thickness, made of an aluminum foil covered on both sides with polypropylene was shaped into a sack, into which the electrode assembly was accommodated in such a manner that the laminated surface shown in FIG. 2 could be seen through the opening of the sack. The nonaqueous liquid electrolyte was injected into the electrode assembly in the laminated film so that the amount reached 4.5 g per Ah of battery capacity to assemble a thin, nonaqueous liquid electrolyte secondary battery, 3 mm in thickness, 40 mm in width and 70 mm in height, constructed as shown in FIGS. 1 and 2.

The nonaqueous liquid electrolyte secondary battery was subjected to an initial charge process by the following procedure. First, the battery was left standing at a high temperature environment at 45° C. for 2 hours and then, under the same environment, charged up to 4.0 V at 0.2 C (120 mA) and then up to 4.2 V at 0.05 C (30 mA) with a constant current and voltage for 15 hours. Thereafter, it was discharged down to 3.0 V at 0.2 C and again charged for the second cycle under the same conditions as those for the first cycle to produce a nonaqueous liquid electrolyte secondary battery.

In order to investigate the change ratio of thickness of the battery before and after the charge/discharge cycles in the nonaqueous electrolyte secondary battery obtained, cycles each consisting of charging up to 4.2 V at 2 C rate with a constant current and voltage at 25° C. for 3 hours and discharging down to 3.0 V at 1 C rate were repeated.

The resistivity change ratio $(R_{500}-R_0)/R_0$, wherein $R_0$ represents a battery resistivity before discharging and $R_{500}$ represents a battery resistivity after 500 cycles, was measured. The resistivity change ratio of the battery for Example 17 is shown in Table 3.

Examples 18 to 23

The same procedure as that of Example 17 was followed, except that the molecular weight and the ratio of ion conductivity σ ($10^{-3}$ S/cm) to viscosity η (cP), p, of the macromolecules to be added to the liquid electrolyte were altered as shown in Table 3, the amount remaining the same, to prepare a thin, nonaqueous liquid electrolyte secondary battery for making evaluations. The characteristics of the battery for each Example are shown in Table 3.

Comparative Example 3

The same procedure as that of Example 17 was followed, except that a mixed solvent of BL and EC (volume ratio 75:25) to which 1.5 mol/l of LiBF$_4$ was dissolved was used for the nonaqueous liquid electrolyte, to prepare a thin, nonaqueous liquid electrolyte secondary battery for making evaluations. The characteristics of the battery for Comparative Example 3 are shown in Table 3.

TABLE 3

| | P | Average molecular weight | $(R_{500}-R_0)/R_0$ |
|---|---|---|---|
| Example 17 | 0.2 | $7 \times 10^6$ | 2.1 |
| Example 18 | 0.03 | $2.3 \times 10^5$ | 2.3 |
| Example 19 | 0.002 | $5.5 \times 10^7$ | 1.4 |
| Example 20 | 0.08 | $4.7 \times 10^3$ | 4.4 |
| Example 21 | 0.009 | $3.8 \times 10^6$ | 1.9 |
| Example 22 | 0.05 | $6.9 \times 10^4$ | 3.1 |
| Example 23 | 0.0003 | $7.4 \times 10^8$ | 1.3 |
| Comparative Example 3 | 3.3 | — | 10 |

As apparent from Table 3, the secondary batteries according to Examples 17 to 23 each having a nonaqueous liquid electrolyte containing a nonaqueous electrolyte wherein the ratio of ion conductivity σ ($10^{-3}$ S/cm) to viscosity η (cP), p (σ/η), is <0.1 in the nonaqueous liquid electrolyte can remarkably reduce the change in battery resistivity after 500 cycles at 25° C. As described above, it is possible according to the present invention to provide a nonaqueous liquid electrolyte secondary battery which suppresses leakage and ensures high discharge characteristics. In addition, it is possible to provide a nonaqueous liquid electrolyte secondary battery which reduces the unevenness of liquid electrolyte and lessens the change of electrodes. Furthermore, it is possible to provide a nonaqueous liquid electrolyte secondary battery which reduces the unevenness of liquid electrolyte and lessens the change in battery resistivity.

What is claimed is:

1. A non-polymerized nonaqueous liquid electrolyte having a viscosity at 20° C. of 60 cP to 30,000 cP comprising:
    a nonaqueous solvent containing 50-95% by volume γ-butyrolactone,,
    an electrolyte dissolved in the nonaqueous solvent, and a macromolecular material added to the nonaqueous solvent comprising the structure represented by the formula:

wherein n≧1,
    wherein the content of the macromolecular material added to the nonaqueous solvent is 0.01% or more, but less than 10% by weight;
    wherein the ratio p ranges from 0.001 to 0.05, wherein p=σ/η, and σ is the ion conductivity ($10^{-3}$ S/cm) and η is the viscosity (cP).

2. The non-polymerized nonaqueous liquid electrolyte of claim 1, which is contained in a liquid electrolyte secondary battery having a positive electrode containing an active material, a negative electrode containing a material which absorbs and desorbs lithium ions, and said liquid electrolyte is sandwiched between the positive and negative electrodes.

3. The non-polymerized nonaqueous liquid electrolyte of claim 1, wherein the electrolyte is a lithium salt(s) other than lithium perchlorate.

4. The non-polymerized nonaqueous liquid electrolyte of claim 1, wherein the electrolyte is a lithium salt(s) selected from the group consisting of lithium hexafluorophosphate, lithium borofluoride, lithium hexafluoroarsenide, lithium trifluorometasulfonate, and bis-tirfluoromethyl sulfonylimide lithium.

5. The non-polymerized nonaqueous liquid electrolyte of claim 1, wherein the electrolyte is lithium perchlorate.

* * * * *